Patented Oct. 17, 1922.

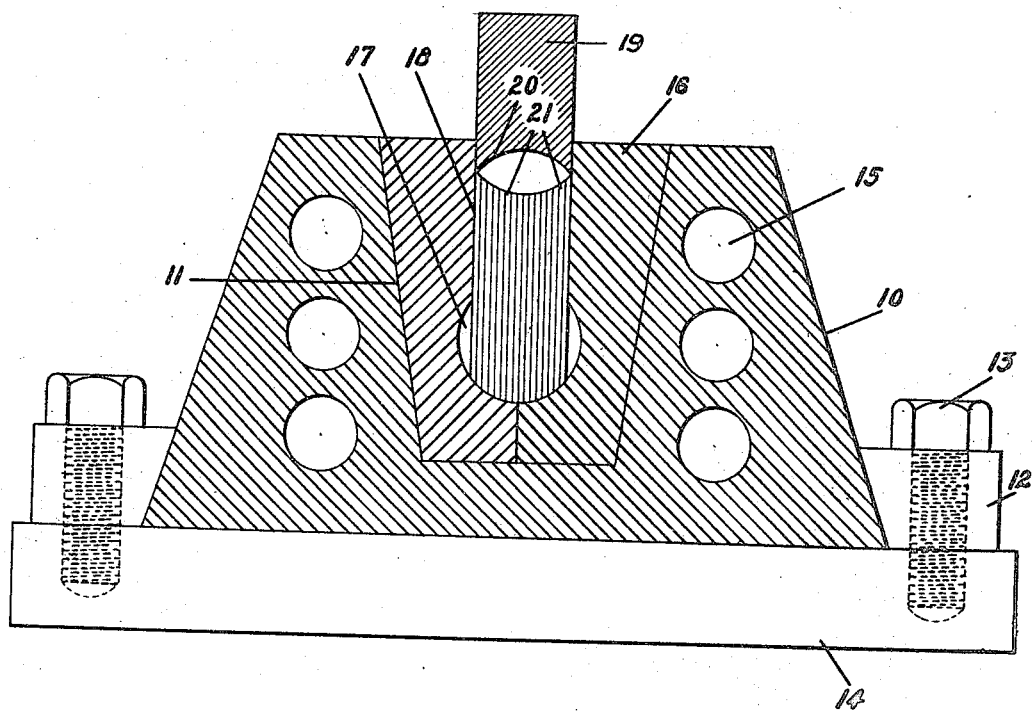

1,431,922

UNITED STATES PATENT OFFICE.

ARTHUR J. BASTIAN, OF EDGEWOOD PARK, PENNSYLVANIA, ASSIGNOR TO WESTINGHOUSE ELECTRIC & MANUFACTURING COMPANY, A CORPORATION OF PENNSYLVANIA.

PROCESS OF FORMING LAMINATED RODS.

Application filed April 9, 1918. Serial No. 227,418.

*To all whom it may concern:*

Be it known that I, ARTHUR J. BASTIAN, a citizen of the United States, and a resident of Edgewood Park, in the county of Allegheny and State of Pennsylvania, have invented a new and useful Improvement in Processes of Forming Laminated Rods, of which the following is a specification.

My invention relates to the formation of laminated rods, and one of its objects is the provision of a simple means and an economical and rapid method of forming rods of this character.

My invention is primarily intended for the manufacture of laminated rods of fibrous sheet material, such as paper, canvas, cotton batting, etc., in which the laminations are impregnated with a binder of suitable character which may be hardened, such as shellac, copal, casein or a phenolic condensation product, such as bakelite.

Heretofore a number of methods have been followed in the manufacture of rods from impregnated fibrous sheet material and a binder, such as a phenolic condensation product. One method employed consisted in superimposing a plurality of sheets of impregnated paper, or equivalent material, to constitute a body or plate of suitable thickness; in subjecting this plate to heat and pressure to compact it and cause the binder, if a phenolic condensation product, to be transformed to its solid, insoluble, and infusible state; in cutting strips of suitable width from this plate and then turning them to cylindrical form in a lathe. Obviously, this method required considerable time, both in the preliminary forming of the plate and in the turning of the rods from strips cut from the plate. Furthermore, a considerable percentage of the crude materials employed was wasted.

Another method, which has been more commonly employed, consisted in rolling the impregnated sheet material, such as paper, into a cylindrical body and then placing the body thus formed in a mold and there subjecting it to heat and pressure to compact the material and harden the condensation product forming the binder. Considerable care was required in winding the paper in cylindrical form, as the proper amount of paper should be employed and the winding must be relatively compact to permit placing of the wound paper in the mold.

My present invention contemplates molding a rod from a plurality of strips of fibrous sheet material, impregnated with a suitable binder, such as bakelite, by placing the superimposed strips, without any previous treatment other than impregnation, in a mold and there subjecting them to heat and pressure to first compact them and bring them into proper shape and to then harden the binder.

In the drawings, Fig. 1 is a vertical, transverse, sectional view, taken through a mold which may be employed in practicing my rod-forming process; Fig. 2 is a transverse, sectional view of a laminated rod formed by my process.

In order to insure a clear and accurate understanding of my present process, I will first describe the construction of one form of mold which may be employed in practicing it. Such a mold includes a mold body or master holder 10, of metal or other suitable material, provided, in its upper face, with a longitudinal channel 11, of suitable depth, having downwardly and inwardly converging sidewalls and a flat bottom wall. This master holder may be provided, at intervals, with apertured ears 12 to receive bolts 13 by which it may be secured to a press plate 14 or other support. Furthermore, the body 10, at suitable intervals about the channel 11, may be provided with passages 15 for circulation of steam for heating the mold and water for cooling it.

Cooperating with the master holder or mold body 10 are a pair of splits 16, preferably equal in height to the depth of the channel 11 and having their outer walls inclined to engage against the inclined sidewalls of the channel when the splits are located therein. These splits, at their lower edges, engage the base of the channel 11 when they are in place and the lower portions of the splits abut against each other. The adjacent faces of these splits are symmetrically recessed to provide, when the splits are assembled in the mold body as shown in Fig. 1, a longitudinal, cylindrical chamber 17, lying half in each split, and a somewhat reduced, longitudinal channel or passage 18 opening from the upper portion of the chamber 17 through the tops of the splits.

A press block or plunger 19 completes the mold, being proportioned to be moved into the passage or slot 18 formed in the inner faces of the splits 16 and to lie with its upper face flush with the upper faces of the splits and with its lower face forming a top wall for the chamber 17, this lower face being concave transversely, as shown at 20, to form a continuation of the wall of the chamber 17 when the press block is in place.

In practising my invention, I provide a plurality of strips 21 of suitably impregnated, fibrous, sheet material of the desired character, in any convenient manner. For instance, these strips may be cut from a single impregnated sheet or a plurality of such sheets may be superimposed upon each other and a number of the strips cut simultaneously by severing the superimposed sheets. In any event, a suitable number of the strips 21, of proper width for the size of the rod to be formed, are stacked upon each other and passed edge-ways through the passage 18, between the splits 16, until their lower edges rest upon the bottom of the chamber 17, the strips then occupying the position shown in Fig. 1. The press block or plunger 19 is then applied, in the manner shown in the drawing, and forced into place by any suitable means, such as by actuation of a press to which the master holder is attached. Preferably, at the same time that pressure is applied to the laminated material in the mold, the mold is heated, to a proper extent, by circulating hot water or steam through the passages 15 of the master holder.

If the impregnating binder of the sheet material is one which softens upon the application of heat and hardens upon subsequent cooling, such as shellac, the mold is first heated to soften the binder and cause it to flow to all parts of the compressed body and then cooled to cause solidification of the binder. If, on the other hand, a phenolic condensation product or equivalent binder, which is rendered hard by the application of heat, is employed, the heat is continued until the binder shall have been fully hardened after which the mold is cooled to facilitate such handling as may be required to remove the finished rod.

In Fig. 2 I have shown a section of a rod 22 formed in a mold of the type described by following out the process set forth. Obviously, by providing a plurality of pairs of splits and corresponding press blocks, the pairs of splits and their press blocks being differently proportioned to provide chambers 17 of different dimensions, rods of any desired diameters may be formed.

Although I have illustrated a preferred form of mold and described my rod-making process in detail, it will be appreciated that I reserve the right to make any changes, both in the molding apparatus employed and in the method of forming the rods, as well as in the materials of which the rods are constructed, which may seem desirable and which come within the scope of the claims.

I claim as my invention:

1. A method of forming laminated rods that comprises forming a stack of strips of impregnated sheet material, placing the stack edge-ways in a cylindrical mold and subjecting the edge of the stack to sufficient pressure to form a cylindrical body while applying heat to the mold.

2. A process of forming laminated rods that comprises impregnating fibrous sheet material with a phenolic condensation product, cutting the impregnated sheet material to form strips, assembling the strips in a stack and subjecting the assembled strips to edge-wise pressure in a heated cylindrical mold to compress the strips into a cylindrical body and harden the condensation product.

3. A method of forming laminated rods that comprises building up a body of superimposed strips of fibrous sheet material impregnated with a binder and subjecting the stack so formed to heat and to sufficient pressure in a cylindrical mold to provide a solid cylinder.

4. A method of forming laminated rods that comprises superimposing a plurality of strips of paper impregnated with a phenolic condensation product, disposing the superimposed strips within a cylindrical mold and subjecting them to heat and to sufficient pressure while in the mold to form a cylindrical body.

In testimony whereof, I have hereunto subscribed my name this 28th day of March, 1918.

ARTHUR J. BASTIAN.